US006388040B1

(12) United States Patent
Fujita et al.

(10) Patent No.: US 6,388,040 B1
(45) Date of Patent: *May 14, 2002

(54) PROPYLENE/ETHYLENE/α-OLEFIN TERPOLYMERS AND PROCESSES FOR THE PRODUCTION THEREOF

(75) Inventors: Hiroyuki Fujita, Ichihara; Jun Saito, Kimitsu; Yoshitoyo Yasuda, Ichihara; Yoshiyuki Ohgi, Yokoshiba-machi; Yasuhiro Shiraishi, Ichihara; Shinji Nakata, Ichihara; Tsutomu Ushioda, Ichihara; Mototake Tsutsui, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/421,329

(22) Filed: Oct. 18, 1999

(30) Foreign Application Priority Data

Oct. 16, 1998 (JP) ............................................. 10-295756
Apr. 28, 1999 (JP) ........................................... 11-122044

(51) Int. Cl.⁷ ............................................. C08F 210/00
(52) U.S. Cl. ....................... 526/348; 526/127; 526/128; 526/126; 526/348.6; 526/943
(58) Field of Search ............................... 526/348, 348.6, 526/127, 128, 126, 943, 90

(56) References Cited

U.S. PATENT DOCUMENTS 5,714,426 A * 2/1998 Tsutsui et al. ............... 502/117

FOREIGN PATENT DOCUMENTS

| JP | 56-143207 | 11/1981 |
| JP | 2-173016 | 7/1990 |
| JP | 9-12635 | 1/1997 |
| WO | 94/28034 | 12/1994 |

OTHER PUBLICATIONS

"Microstructure of polypropene samples produced with different homogeneous bridged indenyl zirconium catalysts. Clues on the structure and reactivity relation", G. Schupfner et al., Journal of Molecular Catalysts A:Chemical 102 (1995) pp. 59–65.

"The Influence of Aromatic Substituents on the Polymerization Behavior of Bridged Zirconocene Catalysts", W. Spaleck et al., Organometallics 1994, 13, pp. 954–963.

* cited by examiner

Primary Examiner—David W. Wu
Assistant Examiner—William Cheung
(74) Attorney, Agent, or Firm—McDermott, Will & Emery

(57) ABSTRACT

A propylene/ethylene/α-olefin terpolymer characterized in that
  i) there is from 0.01 mol % to less than 15 mol % of a comonomer unit with a molar ratio of ethylene units/$C_4$–$C_{20}$ α-olefin units being in the range of from $6.5 \times 10^{-4}$ to 0.99, and from more than 85 mol % to not more than 99.99 mol % of a propylene unit with 2,1- and 1,3-propylene units being in the range of from 0 to 1 mol %, in a polymer chain determined by $^{13}$C-NMR spectroscopy;
  ii) a weight average molecular weight (Mw) determined by GPC is in the range of from 40,000 to 1,000,000; and
  iii) the amount of the component eluted in o-dichlorobenzene at a temperature of not higher than 40° C. is not more than 10 % by weight based on the total weight of the terpolymer and the amount of the component eluted in o-dichlorobenzene within the ±10° C. range of an elution peak temperature is not less than 75 % by weight based on the weight of the component eluted at a temperature of higher than 0° C.

12 Claims, 2 Drawing Sheets

PROPYLENE/ETHYLENE/α-OLEFIN TERPOLYMERS AND PROCESSES FOR THE PRODUCTION THEREOF

FIELD OF THE INVENTION

This invention relates to new propylene/ethylene/α-olefin terpolymers. More particularly, the invention relates to propylene/ethylene/α-olefin terpolymers having a relatively high molecular weight and a narrow molecular weight distribution and a specific elution characteristic in ortho-dichlorobenzene, which are produced using an olefin polymerization catalyst comprising a metallocene compound as a principal component.

A resin composition based on the terpolymer is suitable for the production of the molded products with improved blocking, heat-seal and hot tack properties, transparency and gloss.

BACKGROUND OF THE INVENTION

The resin compositions based on olefin copolymers comprising propylene and ethylene as a principal component have been extensively used in the field of various moldings, because of their good mechanical properties, good chemical resistance and very useful balance with economy. These olefin copolymers have been produced by copolymerizing olefins in the presence of a catalyst comprising an inorganic transition metal catalyst component such as titanium trichloride, titanium tetrachloride and the mixtures thereof which are supported on a support such as magnesium chloride, in combination with an organoaluminum compound, what is called Ziegler-Natta catalyst system.

For instance, Japanese Patent Kokai 56-143207 discloses a propylene/ethylene/α-olefin terpolymer comprising 88 to 96 mol % of a propylene unit, 1.5 to 5.3 mol % of an ethylene unit and 0.7 to 7.6 mol % of an α-olefin unit of $C_4$–$C_{20}$, which is produced using Ziegler-Natta catalyst system. The molded products formed from the resin composition comprising the terpolymer as a base resin are excellent in rigidity and heat resistance.

In recent years, the processes for the production of olefin copolymers have been proposed wherein olefins are copolymerized using a metallocene catalyst system comprising an organic complex of a transition metal, so-called metallocene compound in combinatin with an aluminoxane which is different from prior Ziegler-Natta catalyst system. The olefin copolymers produced using the metallocene catalyst system are more homogenous than those using prior Ziegler-Natta catalyst system, since the molecular weight distribution (Mw/Mn) is narrow and comonomers are copolymerized homogeneously. In the homopolymerization of propylene, choice of metallocene species can produce a polymer which is high in stereoregularity of a propylene unit, i.e., isotactic index.

Journal of Molecular Catalysis A: Chemical 102 (1995) 59–65 mentions, with regard to the relationship between the polymerization temperature and the melting point of the resulting polypropylene using the metallocene catalyst system to provide isotactic polypropylene, that polypropylene of higher melting point is produced at 0° C., but the melting point of polypropylene produced at an industrial polymerization temperature, e.g., 70° C. becomes extremely low.

Organometallics 1994, 13, 954–963 describes that polypropylene of high melting point is produced even at 70° C., an industrial polymerization temperature by selecting a metallocene compound in a homogeneous polymerization system using a catalyst component such as the metallocene compound not supported on a support.

In the polymerization process and apparatus which have been used in the manufacture of propylene copolymers, a supported catalyst having a catalyst component such as metallocene compound supported on a support has been required to use for industrially producing propylene copolymers using the metallocene catalyst system in place of Ziegler-Natta catalyst system.

WO94/28034 discloses that the melting point of polypropylene produced by polymerization of propylene using the supported catalyst having on the support the metallocene compounds providing polypropylene melting at high temperatures is lower than that of polypropylene produced by a homogeneous polymerization.

JPA-2-173016 discloses a heat-sealing agent comprising a propylene polymer wherein a propylene component is 90–100 mol %, an ethylene component is 0–10 mol %, an alpha-olefin component of 4–20 carbons is 0–10 mol %, a melting point (Tm) is in the range of 70<Tm<155–5.5 (100-P) in which p is the propylene content (mol %) present in the polymer, an intrinsic viscosity (η) as measured in decalin at 135° C. is in the range of 0.5 to 6 dl/g and a boiling trichloroethylene-insoluble content is less than 5% by weight, and the propylene polymer is produced by polymerizing propylene alone or copolymerizing propylene and ethylene and/or an alpha-olefin of 4–20 carbons in the presence of a homogeneous catalyst comprising a hafnium compound and an aluminoxane, which is a kind of metallocene compounds.

JPA-9-12635 discloses propylene elastomers containing 50–85 mol % of a propylene unit, 5–40 mol % of a 1-butene unit and 10–40 mol % of an ethylene unit, having the content of the 1-butene unit greater than that of the ethylene unit and having 0.1 to 12 dl/g of an intrinsic viscosity (η) measured in decalin at 135° C. and less than 3 of a polydispersity index (Mw/Mn), and a process for the production of the propylene elastomer by copolymerizing propylene, 1-butene and ethylene in the presence of a homogeneous or supported catalyst for olefin polymerization which comprises a metallocene compound represented by the specific formula and at least one compound being capable of activating the metallocene compound and selected from an organoaluminum compound, an organoaluminumoxy compound and a compound forming an ion pair by reacting with the metallocene compound. The propylene elastomers obtained in the examples have the melting point (Tm) lower than the copolymers disclosed in JPA-2-173016.

As disclosed in JPA-2-173016, the melting point (Tm) of the copolymer comprising propylene as a principal component lowers in inverse proportion to the content of a comonomer component. In both publications as recited above, the heat-sealing property of the film and the elastomeric property of the composition are exhibited by utilizing the lowering in melting point due to the use of the specific metallocene compound as a catalyst for the copolymerization of propylene, ethylene and α-olefin and the lowering in melting point due to the presence of a comonomer.

The boiling trichloroethylene-insoluble content disclosed in JPA-2–173016 shows the content of a high crystalline component in the copolymer. The content of a low molecular weight component in the copolymer is determined as the amount of the component eluted in o-dichlorobenzene as mentioned later. The low molecular weight component in the copolymer is a tacky component and gives an influence on the blocking property of the molded product.

In general, the melting point (Tm) of a propylene copolymer is depending on the molecular weight and crystallinity of the copolymer, and the physical properies of the molded products comprising a propylene copolymer as a base resin, especially rigidity and heat resistance are better with higher melting point of the base resin.

SUMMARY OF THE INVENTION

An object of the invention is to provide a propylene/ethylene/$C_4$–$C_{20}$ α-olefin terpolymer which is low in the reduction of molecular weight even in a relatively high comonomer content, less in the amount of component eluted in o-dichlorobenzene at low temperatures which may be a surface tack component of a film, and relatively high in the melting point.

Another object of the invention is to provide a process for the production of the terpolymer using a metallocene catalyst system.

A further object of the invention is to provide a resin composition comprising the terpolymer as a base resin and a molded product formed therefrom.

The present invention is directed to a propylene/ethylene/α-olefin terpolymer characterized in that i) there is from 0.01 mol % to less than 15 mol % of a comonomer unit with a molar ratio of ethylene units/$C_4$–$C_{20}$ α-olefin units being in the range of from $6.5 \times 10^{-4}$ to 0.99, and from more than 85 mol % to not more than 99.99 mol % of a propylene unit with 2,1- and 1,3-propylene units being in the range of from 0 to 1 mol %, in a polymer chain determined by $^{13}$C-NMR spectroscopy;

ii) a weight average molecular weight (Mw) determined by GPC is in the range of from 40,000 to 1,000,000; and iii) the amount of the component eluted in o-dichlorobenzene at a temperature of not higher than 40° C. is not more than 10% by weight based on the total weight of the terpolymer and the amount of the component eluted in o-dichlorobenzene within the ±10° C. range of an elution peak temperature is not less than 75% by weight, based on the weight of the component eluted at a temperature of higher than 0° C.

The present invention is also directed to a process of producing the propylene/ethylene/α-olefin terpolymer, which comprises copolymerizing propylene, ethylene and an α-olefin of 4 to 20 carbons in the presence of a catalyst for an olefin polymerization which comprises a metallocene compound represented by formula (1)

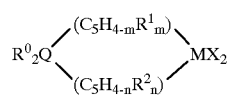

(1)

wherein M represents titanium or zirconium, each X independently represents a hydrogen atom, a halogen atom or a hydrocarbyl radical, $(C_5H_{4-m}R^1_m)$ and $(C_5H_{4-n}R^2_n)$ represent a substituted cyclopentadienyl group in which m and n are an integer of 1 to 3, $R^1$ and $R^2$ each independently represent a hydrocarbyl radical of 1 to 20 carbons, a silicone-containing hydrocarbyl radical or a divalent group in which both of two $R^1$s and two $R^2$s respectively can joint or either of two $R^1$s and two $R^2$s can joint with adjacent two carbon atoms on the cyclopentadienyl ring to form one or more hydrocarbon rings of 4 to 8 carbons which may be substituted by said hydrocarbyl radical, with the substitution position of $R^1$ and $R^2$ on the two cyclopentadienyl rings being arranged so as not to have a symmetry plane containing M, and Q represents a silicon atom or a germanium atom, and each $R^0$ independently represents a hydrogen atom, a halogen atom or a hydrocarbyl radical;

an aluminoxane;

a fine particle support; and an organoaluminum compound.

The present invention is further directed to a resin composition comprising the terpolymer as a base resin and a molded product formed therefrom.

The present invention is further directed to a propylene multi-layer film having a heat-seal layer formed from the resin composition comprising the terpolymer as a base resin.

DETAILED DESCRIPTION OF THE INVENTION

Figure 1:
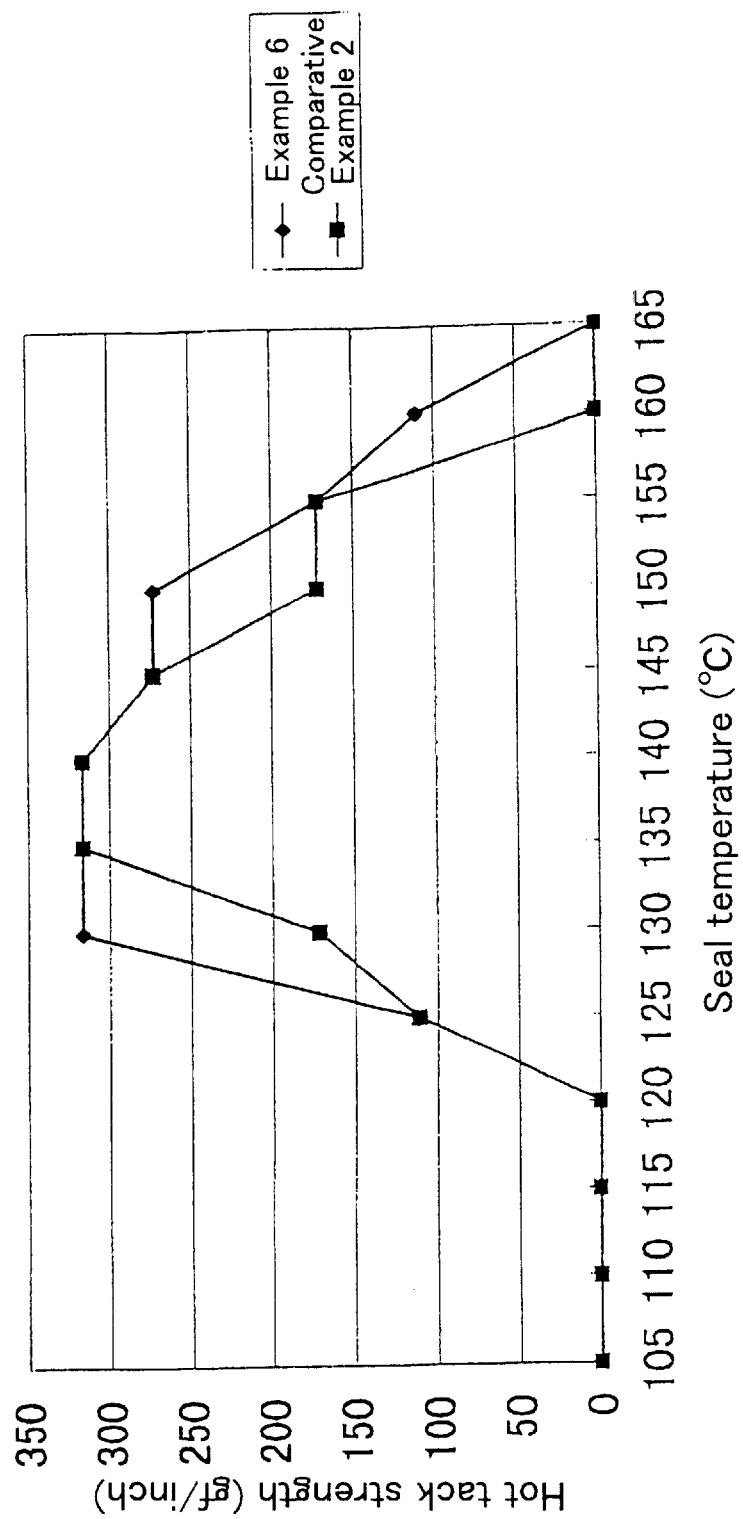
FIG. 1 is a graph showing a relationship between a hot tack strength and a seal temperature of the multi-layer films prepared in Example 6 and Comparative Example 2.
Figure 2:
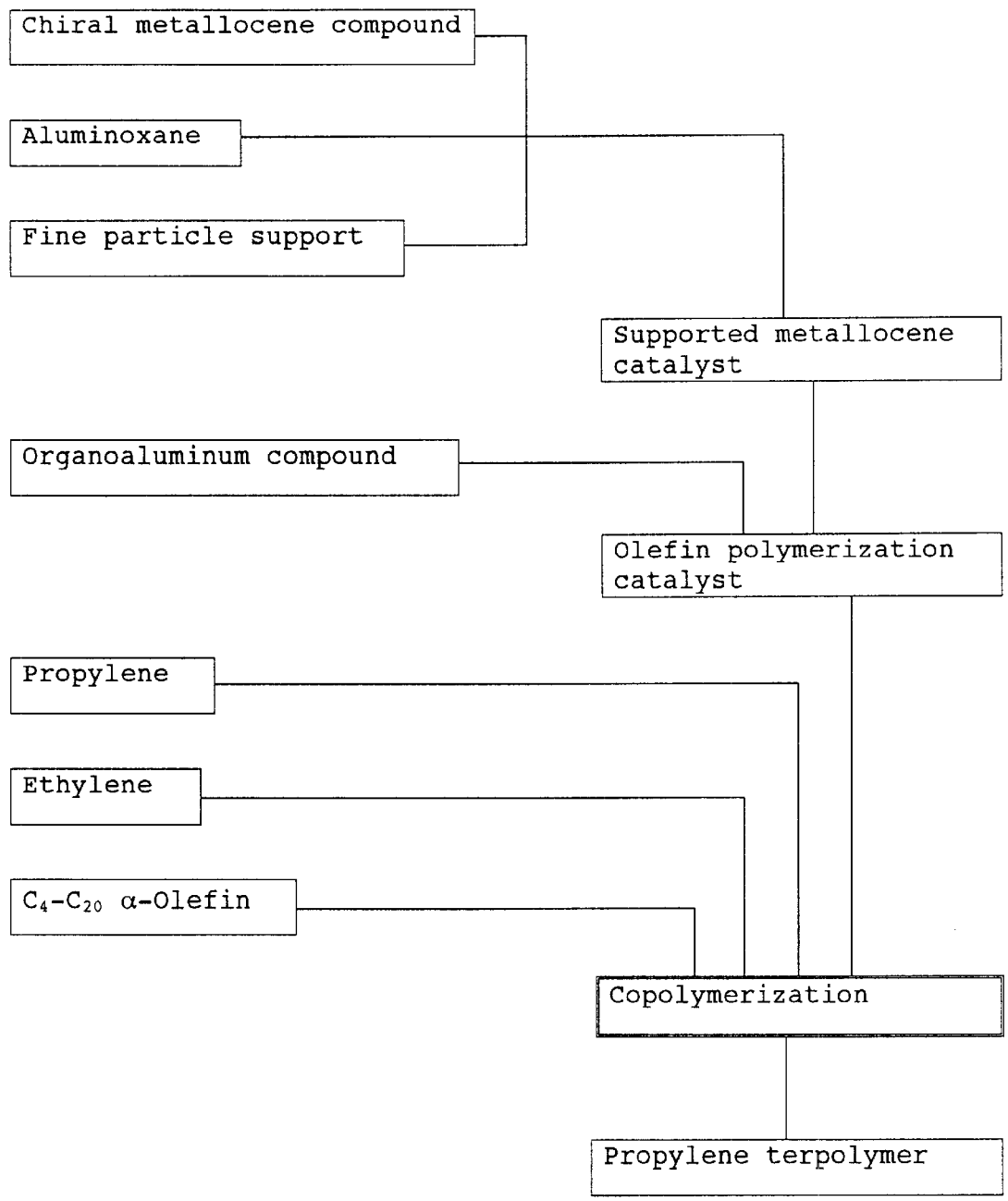
FIG. 2 is a flow sheet illustrating a process for the production of the terpolymer according to the present invention.

The terpolymers of the present invention have compositional and structural characteristics that in a polymer chain determined by $^{13}$C-NMR spectroscopy, there is from 0.01 mol % to less than 15 mol % of a comonomer unit with a molar ratio of ethylene units/$C_4$–$C_{20}$ α-olefin units being in the range of from $6.5 \times 10^{-4}$ to 0.99, and from more than 85 mol % to not more than 99.99 mol % of a propylene unit with 2,1- and 1,3-propylene units being in the range of from 0 to 1 mol %.

The composition and structure of the terpolymer by $^{13}$C-NMR spectroscopy can be analyzed from $^{13}$C-NMR spectrum which was determined for a solution of 20% by weight of the polymer in a mixed solvent of o-dichlorobenzene/benzene bromide with 8/2 weight ratio under the condition of 67.20 MHz and 130° C., using a NMR spectrometer (e.g., JEOL-GX270 manufactured by Nihon Densi K. K. in Japan).

For the contents of the ethylene unit and the $C_4$–$C_{20}$ α-olefin unit, the assignment of each peak in $^{13}$C-NMR spectra can be calculated in accordance with the assignment method outlined by Carman et al. in Rubber Chem. Technol., 44, 781 (1971). The ethylene content can be calculated on the basis of the equation proposed by G. J. Ray et al. described in Macromolecules, 10, 773 (1977). The α-olefin content can be calculated on the basis of the equation proposed in J. C. Randall described in Macromolecules, 11, 592 (1978).

From the respective contents of the ethylene unit and the $C_4$–$C_{20}$ α-olefin unit, the molar ratio of ethylene units/$C_4$–$C_{20}$ α-olefin units as well as the contents of the comonomer unit and the propylene unit can be calculated.

Excessive content of the comonomer unit will result in larger reduction in the melting point (Tm) of the terpolymer. Excessive molar ratio of ethylene units/$C_4$–$C_{20}$ α-olefin units, i.e., excessive content of the ethylene unit will result in lowering of the crystallinity of the terpolymer which leads to lowering of the melting point (Tm), thus resulting in unsatisfactory rigidity and heat resistance of the molded product formed from the resin composition comprising the terpolymer as a base resin.

In the terpolymer of the present invention, the content of the comonomer unit varies depending on kind of $C_4$–$C_{20}$ α-olefins, and is usually from 0.01 to less than 15 mol %, preferably from 0.1 to less than 15 mol %, and more preferably from 4.0 to less than 15 mol %. Further, the molar ratio of ethylene units/$C_4$–$C_{20}$ α-olefin units in the comonomer unit varies depending on kind of $C_4$–$C_{20}$ α-olefins, and is usually from $6.5 \times 10^{-4}$ to 0.99, preferably from $6.5 \times 10^{-3}$ to 0.99, and more preferably from $6.5 \times 10^{-3}$ to 0.9.

The $C_4$–$C_{20}$ α-olefins include, e.g., 1-butene, 1-pentene, 1-hexene, 1-octene, 1-decene, 1-dodecene, 4-methyl-1-pentene, 3-methyl-1-pentene, etc. and the mixtures of their two or more compounds, 1-butene being especially preferable.

The 2,1- and 1,3-propylene units in the propylene unit can be calculated from $^{13}$C-NMR spectra based on the method proposed by T. Tsutsui et al. in POLYMER Vol. 30, 1350 (1989).

As mentioned in the above reference, the 2,1- and 1,3-propylene units in the polymer chain are present as an irregular unit in the propylene unit usually present in the form of 1,2-propylene unit, which is one of the factors for lowering the melting point (Tm) of the terpolymer.

In the terpolymer of the present invention, the 2,1- and 1,3-propylene units in the polymer chain are in the range of 0 to 1 mol %, preferably 0 to 0.7 mol %, more preferably 0 to 0.4 mol % and most preferably 0 to 0.35 mol %.

The weight average molecular weight (Mw), the number average molecular weight (Mn) and the ratio thereof (Mw/Mn), i.e., polydispersity index can be determined at 135° C. by a gel permeation chromatography (GPC) (e.g., GPC-150C manufactured by Waters Co., Ltd.) with a mixed polystyrene gel column (e.g., PSK gel GMH6-HT manufactured by Toso K. K. in Japan) using a solution of 0.05% by weight of the polymer in o-dichlorobenzene.

Too few weight average molecular weight (Mw) or excessive Mw/Mn ratio means an excessive presence of the low molecular weight component, which lowers "elution characteristics of the polymer in o-dichlorobenzene" which will be defined later. Excessive weight average molecular weight (Mw) lowers a melt flow rate (MFR) of the polymer, i.e., its fluidity, thus lowering the processability of the polymer.

The weight average molecular weight (Mw) of the present terpolymer is in the range of 40,000 to 1,000,000, preferably 100,000 to 1,000,000, and the ratio (Mw/Mn) thereof to the number average molecular weight (Mn) is in the range of 1.5 to 3.5, preferably 1.7 to 3.0 and more preferably 1.8 to 2.5.

The terpolymer of the present invention is characterized in that the amount of the component eluted in o-dichlorobenzene at a temperature of not higher than 40° C. is not more than 10% by weight based on the total weight of the terpolymer and that the amount of the component eluted in o-dichlorobenzene within the ±10° C. range of an elution peak temperature is not less than 75% by weight based on the weight of the component eluted at a temperature of higher than 0° C., as mentioned in iii) above. This characteristic is referred to hereafter as "elution characteristics of the polymer in o-dichlorobenzene" for the convenience of explanation about the present invention.

The elution characteristics can be determined by the following fractionation method.

A fractionation column comprising a stainless steel tube (15 cm in length, 0.46 cm in inside diameter) filled with glass beads 0.1 mm in diameter (filled throughout its entire length of 15 cm) is kept at 140° C. 0.5 ml of a sample with 2 mg/ml of a polymer concentration is fed to the column in which the polymer was dissolved in o-dichlorobenzene at a temperature of about 140° C. and the sample is retained therein. Then the temperature of the fractionation column is lowered to 0° C. at a rate of 1° C./min and the polymer in the sample is precipitated on the surface of glass beads. While keeping the temperature of the fractionation column at 0° C., o-dichlorobenzene at 0° C. is allowed to flow through the fractionation column at a flow rate of 1 ml/min for 2 minutes to elute a polymer component soluble in o-dichlorobenzene at 0° C., thus giving an extract solution. A molecular weight distribution of the polymer in the extract solution is determined by an infrared detector (3.42 μm). Subsequently, the above operation is repeated by varying stepwise the temperature of the fractionation column and the temperature of o-dichlorobenzene (extraction temperature) with an increment of 10° C. in the range of 0 to 50° C., an increment of 5° C. in the range of 50 to 90° C. and an increment of 3° C. in the range of 90 to 140° C. An elution amount of each component is calculated from an elution curve of extraction temperature (° C.) vs. weight fraction ( % by weight) which is depicted by plotting the amount of the polymer component eluted in o-dichlorobenzene at each temperature and the calculated result of the weight fraction and molecular weight of the polymer in each fraction. The details of the above fractionation method are described by Takao Usami et al. in Journal of Applied Polymer Science: Applied Polymer Symposium 52, 145–158 (1993).

The term "elution peak temperature" as used herein refers to a temperature at which the elution amount of each component is maximum.

For the terpolymer of the present invention, the amount of the component eluted at a temperature of not higher than 40° C. is not more than 10% by weight based on the amount of all components, preferably not more than 6% and more preferably not more than 5%, when the amount of the terpolymer eluted at each temperature is determined by elevating stepwise the above extraction temperature.

Further, it is required that the amount of the component eluted within the ±10° C. range of an elution peak temperature is not less than 75%, preferably not less than 80% and more preferably not less than 85% based on the amount of all components eluted at a temperature of higher than 0° C.

The component eluted in o-dichlorobenzene at a temperature of not higher than 40° C. is a tacky component of essentially low molecular weight which reduces a blocking resistance of the molded product. The component eluted within the ±10° C. range of an elution peak temperature is a high crystalline component which improves the rigidity of the molded product.

The melting point (Tm) of the terpolymer according to the present invention varies depending on the content of the comonomer unit, the molar ratio of the ethylene units/the $C_4$–$C_{20}$ α-olefin units and the type of α-olefins constituting the polymer, but it is usually in the range of 100 to 160° C., and preferably 110 to 140° C.

The melting point (Tm) refers to a temperature showing a peak on melting which was determined by heating the terpolymer from room temperature to 230° C. at a rate of 30° C./min, keeping it at the same temperature for 10 minutes, followed by lowering to −20° C. at a rate of −20° C./min, keeping it at the same temperature for 10 minutes and heating again it at a rate of 20° C./min, using a DCS 7 type differential scanning calorimeter manufactured by Perkin Elmer Co.

The terpolymer having various characteristics as described above can be produced by a process which comprises copolymerizing propylene, ethylene and an α-olefin of 4 to 20 carbons in the presence of a catalyst for an olefin polymerization which comprises a metallocene compound represented by formula (1)

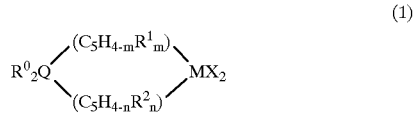
(1)

wherein M represents titanium or zirconium, each X independently represents a hydrogen atom, a halogen atom or a hydrocarbyl radical, $(C_5H_{4-m}R^1_m)$ and $(C_5H_{4-n}R^2_n)$ represent a substituted cyclopentadienyl group in which m and n are an integer of 1 to 3, $R^1$ and $R^2$ each independently represent a hydrocarbyl radical of 1 to 20 carbons, a silicone-containing hydrocarbyl radical or a divalent group in which both of two $R^1$s and two R 2s respectively can joint or either of two $R^1$s and two $R^2$s can joint with adjacent two carbon atoms on the cyclopentadienyl ring to form one or more hydrocarbon rings of 4 to 8 carbons which may be substituted by said hydrocarbyl radical, with the substitution position of $R^1$ and $R^2$ on the two cyclopentadienyl rings being arranged so as not to have a symmetry plane containing M, and Q represents a silicon atom or a germanium atom, and each $R^0$ independently represents a hydrogen atom, a halogen atom or a hydrocarbyl radical;

an aluminoxane;

a fine particle support; and an organoaluminum compound.

The halogen atoms represented by X and $R^0$ in formula (1) include fluorine, chlorine, bromine and iodine. The hydrocarbyl radicals represented by X, $R^0$, $R^1$ and $R^2$ include a straight- or branched chain alkyl group of 1 to 20 carbons such as methyl, ethyl, propyl, isopropyl, butyl, isobutyl, sesquibutyl, tertiary butyl, pentyl, heptyl, hexyl, octyl, 2-ethylhexyl, nonyl, decyl, dodecyl, octadecyl, etc.; a halogenated alkyl group wherein a part or all of the hydrogen atoms in the alkyl group are substituted by said halogen atom; an unsubstituted or substituted cycloalkyl group which may be substituted by said halogen atom, said alkyl or halogenated alkyl group, such as cyclopentyl, cyclohexyl, etc.; an unsubstituted or substituted aryl group which may be substituted by said halogen atom, said alkyl or halogenated alkyl group, such as phenyl, naphthyl, benzyl, etc.; an alkoxy group such as methoxy, ethoxy, isopropoxy, butoxy, etc.; a halogenated alkoxy group wherein a part or all of the hydrogen atoms in the alkoxy group are substituted by said halogen atom; and an unsubsituted or substituted aryloxy group such as phenoxy, benzyloxy, etc.

The silicone-containing hydrocarbyl radicals represented by $R^1$ and $R^2$ include a trialkylsilyl group such as trimethylsilyl, triethylsilyl, dimethylethylsilyl, methyldiethylsilyl, etc.; a trialkylsilylalkyl group such as trimethylsilylmethyl, triethylsilylethyl, etc.; and a trialkylsilyloxy group such as trimethylsilyloxy, triethylsilyloxy, etc.

The divalent groups in which both of two $R^1$s and two $R^2$ s respectively can joint or either of two $R^1$s and two $R^2$s can joint with adjacent two carbon atoms on the cyclopentadienyl ring to form one or more hydrocarbon rings of 4 to 8 carbons, include an alkylene group such as ethylene, propylene, butene, pentene, hexene, etc.; an alkenyl group such as ethynyl, propenyl, butenyl, etc.; an alkadienyl group such as butadienyl, pentadienyl, hexadienyl, etc, preferably butadienyl which forms together with a cyclopentadienyl ring, an indenyl group or a fluorenyl group. Said hydrocarbon rings may be substituted by the hydrocarbyl radical, the silicone-containing hydrocarbyl radical, etc. as described above.

It is preferable that at least one of $R^1$ and $R^2$ substitutes a carbon adjacent to the carbon attached to Q on the cyclopentadienyl ring.

As a metallocene compound in the process of producing the terpolymer of the present invention, any metallocene compound of formula (1) can be used. Preferable metallocene compounds used include, for example, dimethylsilylene(2,4-dimethylcyclopentadienyl)(2', 3'-dimethylcyclopentadienyl)titanium dichloride, dimethylsilylene(2,4-dimethylcyclopentadienyl)(2', 3'-dimethylcyclopentadienyl)zirconium dichloride, dimethylgermylene(2,4-dimethylcyclopentadienyl)(2',3'-dimethylcyclopentadienyl)titanium dichloride, dimethylgermylene(2,4-dimethylcyclopentadienyl)(2',3'-dimethylcyclopentadienyl)zirconium dichloride, dimethylsilylene(2,4-dimethylcyclopentadienyl)(2',3'-dimethylcyclopentadienyl)titanium dimethyl, dimethylsilylene(2,4-dimethylcyclopentadienyl)(2',3'-dimethylcyclopentadienyl)zirconium dimethyl, dimethylgermylene(2,4-dimethylcyclopentadienyl)(2',3'-dimethylcyclopentadienyl)titanium dimethyl, dimethylgermylene(2,4-dimethylcyclopentadienyl)(2',3'-dimethylcyclopentadienyl)zirconium dimethyl, dimethylsilylene(2,3,5-trimethylcyclopentadienyl)(2',4',5'-trimethylcyclopentadienyl)titanium dichloride, dimethylsilylene(2,3,5-trimethylcyclopentadienyl)(2',4',5'-trimethylcyclopentadienyl)zirconium dichloride, dimethylgermylene(2,3,5-trimethylcyclopentadienyl)(2',4', 5'-trimethylcyclopentadienyl)titanium dichloride, dimethylgermylene(2,3,5-trimethylcyclopentadienyl)(2',4', 5'-trimethylcyclopentadienyl)zirconium dichloride, dimethylsilylene(2,3,5-trimethylcyclopentadienyl)(2',4',5'-trimethylcyclopentadienyl)titanium dimethyl, dimethylsilylene(2,3,5-trimethylcyclopentadienyl)(2',4',5'-trimethylcyclopentadienyl)zirconium dimethyl, dimethylgermylene(2,3,5-trimethylcyclopentadienyl)(2',4', 5'-trimethylcyclopentadienyl)titanium dimethyl, dimethylgermylene(2,3,5-trimethylcyclopentadienyl)(2',4', 5'-trimethylcyclopentadienyl)zirconium dimethyl, rac-dimethylsilylene bis(2,5-dimethyl-3-phenyl-cyclopentadienyl)zirconium dichloride, and rac-dimethylsilylene bis(2,5-dimethyl-3-p-tolyl-cyclopentadienyl)zirconium dichloride, etc. In particular, dimethylsilylene(2,3,5-trimethylcyclopentadienyl)(2',4',5'-trimethylcyclo pentadienyl)zirconium dichloride, dimethylgermylene(2,3,5-trimethylcyclopentadienyl)(2',4', 5'-trimethylcyclo pentadienyl)zirconium dichloride, rac-dimethylsilylene bis(2,5-dimethyl-3-phenyl-cyclopentadienyl)zirconium dichloride and rac-dimethylsilylene bis(2,5-dimethyl-3-p-tolyl-cyclopentadienyl)zirconium dichloride are preferably used.

The aluminoxane is an organoaluminum compound represented by formula (2) or (3).

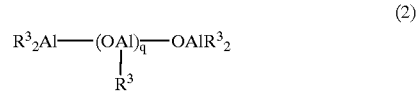
(2)

-continued (3)

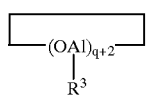

wherein $R^3$s may be the same or different and each is a hydrocarbyl radical of 1 to 6 carbons, e.g., an alkyl group such as methyl, ethyl, propyl, butyl, isobutyl, pentyl, hexyl, etc.; an alkenyl group such as allyl, 2-methylallyl, propenyl, isopropenyl, 2-methyl-1-propenyl, butenyl, etc.; a cycloalkyl group such as cyclopropyl, cyclobutyl, cyclopentyl, cyclohexyl, etc.; and an aryl group, etc, preferably a hydrocarbyl radical of 1 to 4 carbons, more preferably a $C_1$–$C_4$ alkyl group. q is an integer of 4 to 30, preferably 6 to 30, and more preferably 8 to 30.

The above-mentioned aluminoxanes can use commercially available products, and also they may be prepared under various known conditions, for example by the following methods:

i) a method of reacting a trialkyl aluminum, e.g., trimethyl aluminum, triisobutyl aluminum or the mixture thereof, directly with water in an organic solvent such as toluene, ether, etc. in the presence of an acid or alkali catalyst;

ii) a method of reacting a trialkyl aluminum, e.g., trimethyl aluminum, triisobutyl aluminum or the mixture thereof, with salts containing crystal water, e.g., copper sulfate hydrate and aluminum sulfate hydrate;

iii) a method of reacting water impregnated in silica gel or the like, with a trialkyl aluminum, e.g., trimethyl aluminum, triisobutyl aluminum, separately or simultaneously or successively.

The fine particle support is granulate or spherical solid fine prticles having a particle diameter of 1 to 500 µm, preferably 5 to 300 µm, on which the above metallocene compound and aluminoxane or the reaction product thereof are supported. Any inroganic and organic support can be used.

For the fine particle inorganic supports, metal oxides, e.g., $SiO_2$, $Al_2O_3$, MgO, $ZrO_2$, $TiO_2$ and the mixture thereof or composite oxides thereof are preferable. Especially preferable are metal oxides comprising as a principal component at least one material selected from the group consisting of $SiO_2$, $Al_2O_3$ and MgO. More specific inorganic supports include $SiO_2$, $Al_2O_3$, MgO, $SiO_2$—$Al_2O_3$, $SiO_2$—MgO, $SiO_2$—$TiO_2$, $SiO_2$—$Al_2O_3$—MgO, etc. These inorganic oxide supports are used after fired usually at a temperature of 100 to 1000° C. for 1 to 40 hours. Instead of firing, they may be used after chemically dehydrated, e.g., with $SiCl_4$, chlorosilane, etc.

The fine particle organic supports include polymer fine particles, e.g., polyolefins such as polyethylene, polypropylene, poly(1-butene), poly(4-methyl-1-pentene), polystyrene or the like.

In the copolymerization of propylene, ethylene and $C_4$–$C_{20}$ α-olefins, the metallocene compound, aluminoxane and fine particle support are usually used as a supported metallocene catalyst having the metallocene compound and aluminoxane or the reaction product thereof supported on the fine particle support, in combination with the later-mentioned organoaluminum compound.

The supported metallocene catalyst can be prepared usually by depositing a metallocene compound and aluminoxane soluble in a hydrocarbon solvent on a dehydrated support. The metallocene compound and aluminoxane can be added to the support in any order. For instance, any method may be employed including a method of initially adding a metallocene compound dissolved in a suitable hydrocarbon solvent to a support, followed by reaction and subsequently adding aluminoxane, followed by further reaction; a method of adding a reaction product of aluminoxane and a metallocene compound to a support, followed by reaction; and a method of initially adding aluminoxane to a support, followed by reaction and subsequently adding a metallocene compound, followed by further reaction.

The reaction temperature in the above reaction for supporting is usually –20 to 100° C., preferably 0 to 100° C. The reaction time is usually 0.1 minute or more, and preferably 1 to 200 minutes.

The supported metallocene catalyst as prepared in the above-mentioned manner is preferably used after pre-activated by prepolymerizing small amounts of olefins in the presence of the catalyst.

The olefins used for the pre-activation include ethylene, propylene, 1-butene, 1-hexene, 3-methyl-1-butene, 4-methyl-1-pentene, etc. and the mixture of two or more compounds.

Most preferred embodiment of the supported metallocene catalysts used for the production of the copolymers according to the present invention is the following embodiment (A) or (B).

(A) an embodiment of using as a supported metallocene catalyst a solid product comprising a reaction product of the metallocene compound and aluminoxane supported on an inorganic fine particle support, the solid product being prepared by carrying out steps (a) to (c) which comprises in sequence (a) reacting an organic transition metal compound having at least one π-electron conjugated ligand (merely called hereafter "metallocene compound") and aluminoxane in an inert solvent to prepare a reaction product, (b) contacting the reaction product prepared in step (a) with an inorganic fine particle support at a temperature of 85 to 150° C. in the presence of an inert solvent to prepare a solid product, and (c) washing at least two times the solid product prepared in step (b) with an aliphatic hydrocarbon at a temperature of –50° C. to 50° C.

(B) an embodiment of using as a pre-activated, supported metallocene catalyst a pre-activated solid product comprising a reaction product of the metallocene compound and aluminoxane and an olefin (co)polymer supported on an inorganic fine particle support, which is prepared by carrying out step (d) of contacting the solid product prepared in step (c) with at least one olefin to perform a prepolymerization.

The supported metallocene catalyst used in the present invention, i.e., the solid product comprising the reaction product of the metallocene compound and aluminoxane supported on the inorganic fine particle support (the above embodiment (A)) contains 0.01 to 5% by weight, preferably 0.03 to 2% by weight of a transition metal derived from the metallocene compound and 0.1 to 50% by weight, preferably 1 to 40% by weight of aluminum derived from aluminoxane.

The inert solvents used for the reaction of the metallocene compound and aluminoxane in the above step (a) can include aromatic hydrocarbons such as benzene, toluene, xylene, cumene, etc.; aliphatic hydrocarbons such as butane, tetramethylbutane, pentane, ethylpentane, trimethylpentane, hexane, methylhexane, ethylhexane, dimethylhexane, heptane, methylheptane, octane, nonane, decane, hexadecane, octadecane, etc.; alicyclic hydrocarbons such as cyclopentane, methylcyclopentane, cyclohexane, cyclooctane, etc.; halogenated hydrocarbons wherein said aromatic hydrocarbons, said aliphatic hydrocarbons or said alicyclic hydrocarbons are substituted by halogen; ethers such as ethylether, tetrahydrofuran, etc.; and the mixed solvents thereof. Preferable inert solvent is aromatic hydrocarbons. Commercially available solvents for aluminoxane solution may be used as such or in combination with other aromatic hydrocarbons or the like.

The reaction product of the metallocene compound and aluminoxane produced in step (a) is prepared by reacting 10 to 1,000 mols, preferably 20 to 500 mols, in terms of an aluminum atom, of aluminoxane per mol of the metallocene compound in an inert solvent at a temperature of −50° C. to 100° C., preferably 0° C. to 50° C. for 10 min. to 10 hrs., preferably 3 min. to 5 hrs.

The use of inert solvents is preferable in the progress of homogenous and effective reaction. The amount of inert solvents used is not limited particularly, but usually 10 to 10,000 liters, preferably 10 to 1,000 liters per mol of the metallocene compound.

In a subsequent step (b), the reaction product prepared in step (a) and an inorganic fine particle support are usually contacted in the presence of an inert solvent which has been used as a reaction solvent in step (a), by which the reaction product is supported on the inorganic fine particle support to give a solid product. In this contact reaction, additional inert solvent may be added as the need arises.

A ratio of the reaction product prepared in step (a) to the inorganic fine particle support is 1 to 1,000 kg, preferably 5 to 500 kg of the inorganic fine particle support per mol of the transition metal atom in the reaction solution. The amount of inert solvents used is 10 to 10,000 liters, preferably 10 to 1,000 liters per mol of the transition metal atom in the reaction solution.

The reaction product prepared in step (a) and the inorganic fine particle support are contacted at a temperature of 85 to 150° C., preferably 90 to 130° C., most preferably 95 to 120° C., for 5 min. to 100 hrs., preferably 10 min. to 50 hrs. In particular, the temperature is an important factor, and the contact within the above-mentioned temperature range can achieve high polymerization activity of the resulting supported metallocene catalyst, high bulk density and good particle property of the propylene terpolymer produced using the supported catalyst.

In a subsequent step (c), the solid product prepared in step (b) can be washed at least two times with an aliphatic hydrocarbon to prepare the supported metallocene catalyst for the (co)polymerization of olefins which comprises the solid product having the reaction product of the metallocene compound and aluminoxane supported on the inorganic fine particle support.

The aliphatic hydrocarbons used for washing the solid product in step (c) can include butane, tetramethylbutane, pentane, ethylpentane, trimethylpentane, hexane, methylhexane, ethylhexane, dimethylhexane, heptane, methylheptane, octane, nonane, decane, hexadecane, octadecane and the mixed solvents thereof. Preferably, n-hexane, isopentane or the mixture thereof is used.

The method which can be employed as step (c) is, for example, a method wherein after completion of step (b), the inert solvent is separated from a slurry of reaction solution containing the solid product by filtration, centrifugal separation or decantation, etc. and subsequently the solid product is washed with an aliphatic hydrocarbon, or a method wherein after completion of step (b), without separating the inert solvent from a slurry of reaction solution containing the solid product, an aliphatic hydrocarbon is added to separate a mixed solvent of the inert solvent and the aliphatic hydrocarbon and subsequently the solid product is washed with an aliphatic hydrocarbon.

The condition for washing the solid product in step (b) is to repeat the washing until the metallocene compound is no longer dissolved out in the aliphatic hydrocarbon at a temperature of −50 to 50° C., preferably −30 to 40° C., most preferably −30 to 30° C., using 1 to 500 liters, preferably 10 to 100 liters of the aliphatic hydrocarbon per kg of the inorganic particle support per one washing. At least 2 times, usually 4 times of washing are sufficient, but not limited thereto. In step (c), particularly, the condition of a washing temperature is an important factor. Washing within the above-described temperature range can produce the supported metallocene catalyst having high polymerization activity. The propylene terpolymers produced by using the supported metallocene catalyst have high bulk density and good particle property.

The above supported metallocene catalyst can be used, in combination with the organoaluminum compound, as a catalyst for copolymerization of propylene and $\alpha$, $\omega$-diene performed by a gas phase polymerization or a bulk polymerization.

Further, a preactivated catalyst wherein a slight amount of olefin is contacted with the above supported metallocene catalyst to make the polymerization activity more active can be used, in combination with the organoaluminum compound, as a preferable catalyst for various copolymerization processes such as slurry polymerization using a solvent, gas phase polymerization and bulk polymerization.

The term of "preactivation" as used herein means that the supported metallocene catalyst is preactivated by (co) polymerization with olefins so that a polymerization activity of the catalyst on the copolymerization reaction using the supported metallocene catalyst is suitable for the conditions of various processes such as slurry, gas phase and bulk polymerization processes.

In the supported metallocene catalyst as preactivated, 0.01 to 100 kg, preferably 0.05 to 50 kg of an olefin (co)polymer for preactivation is further supported per kg of the supported catalyst, i.e., a solid product on which a reaction product of the metallocene compound and aluminoxane is supported. By supporting the olefin (co)polymer, the polymerization activity of the supported catalyst can be activated previously so that the preactivated catalyst is suitable for the use under the conditions of various polymerization processes.

Olefins for olefin (co)polymerization which are supported on the preactivated, supported metallocene catalyst can include straight-chain olefins of 2–20 carbons, e.g., ethylene, propylene, 1-butene, 1-pentene, 4-methyl-1-pentene, 2-methyl-1-pentene, 1-hexene, 1-octene, 1-decene, 1-dodecene, etc., and the homopolymers thereof or the copolymers of two or more olefins are supported. In particular, ethylene and propylene homopolymers or olefin copolymers based on ethylene or propylene are preferable for the supporting olefin (co)polymers. Further, these olefin (co)polymers have preferably 0.1 to 10 dl/g, more preferably 0.2 to 7 dl/g of an intrinsic viscosity [$\eta$] as determined in decalin at 135° C.

In step (d), pre(co)polymerization of the solid product obtained in step (c) by contacting an olefin therewith results in coating and supporting the olefin copolymer on the solid product, which leads to preactivation. A preferable process for the pre(co)polymerization of olefin is the process of introducing an olefin into a slurry of the solid product obtained in step (c) dispersed in an aliphatic hydrocarbon to perform the pre(co)polymerization.

As the slurry of the solid product dispersed in the aliphatic hydrocarbon, a solid product obtained by washing at the final stage in step (c) may be used as such without separation from the aliphatic hydrocarbon, or a separated solid product may be used after redispersing in a similar aliphatic hydrocarbon.

Pre(co)polymerization of an olefin can be conducted in a liquid phase using as a solvent the olefin itself to be (co)polymerized or in a gas phase without any solvent, but it is preferably carried out in the presence of an aliphatic hydrocarbon to control the (co)polymerization of a small quantity of olefin and promote a homogenous reaction.

The prepolymerization of olefin in the aliphatic hydrocarbon is conducted by introducing 0.01 to 1000 kg, preferably 0.1 to 500 kg of an olefin into a slurry comprising 0.005 to 5 $m^3$, preferably 0.01 to 1 $m^3$ of an aliphatic hydrocarbon per kg of the solid product in step (c), followed by (co)polymerization reaction of olefin at a temperature of −50 to 100° C., preferably 0 to 50° C., for one minute to 50 hrs, preferably 3 minutes to 20 hrs.

In the (co)polymerization of olefin, there is no need to add a cocatalyst, a typical example of which is an organoaluminum compound such as trialkylaluminum and aluminoxane, since a reaction product of metallocene and aluminoxane has been supported on the solid product in step (c). The cocatalyst may be added if desired. The amount of the cocatalyst added is preferably within the range of not more than 1,000 mols, preferably not more than 500 mols in terms of an aluminum atom per mol of a transition metal atom in the solid product. Further, the pre(co)polymerization of olefin may be carried out in the presence of hydrogen to control the molecular weight of the resulting olefin (co)polymer.

The preactivated, supported metallocene catalyst as prepared above can be stored in the slurry state after completion of the pre(co)polymerization, or in the resuspended state in an aliphatic hydrocarbon after completion of the pre(co) polymerization of olefin and washing with the aliphatic hydrocarbon, or in the dry state by separation of the aliphatic hydrocarbon.

The process of producing the terpolymer of the present invention comprises the copolymerization of propylene, ethylene and an α-olefin in the presence of a catalyst system comprising a combination of the above supported metallocene catalyst and the organoaluminum compound or in the presence of a catalyst system comprising a combination of the preactivated, supported metallocene catalyst and the organoaluminum compound.

The organoaluminum compound is used as a scavenger in the copolymerization of olefins using the supported metallocene catalyst. The organoaluminum compounds include, e.g., triethylaluminum, tri-isopropylaluminum, tri-isobutylaluminum, tri-n-butylaluminum, tri-n-hexylaluminum, di-iso-butylaluminum hydride and the mixtures thereof. In particular, triethylaluminum and tri-isobutylaluminum are preferably used.

The amount of the organoaluminum compound used ranges from 1 to 5,000 mols, preferably 5 to 3,000 mols and more preferably 10 to 1,000 mols per mol of the transition metal atom in the supported metallocene catalyst.

In the present invention, the amount of the olefin polymerization catalyst used ranges from $1 \times 10^{-10}$ to $1 \times 10^{-3}$ mol, preferably $1 \times 10^{-9}$ to $1 \times 10^{-4}$ mol in terms of the transition metal atom in the catalyst, per liter of a polymerization volume. By maintaining the amount of the catalyst used in the above range, the rate of a copolymerization of olefin based on propylene can be kept at an efficient and controlled rate. The term of "polymerization volume" as used herein means an internal volume of a polymerization reactor in case of a liquid phase polymerization, and a volume of a gas phase section within a polymerization reactor in case of a gas phase polymerization.

As a process for the copolymerization of propylene, ethylene and α-olefin, known polymerization processes of propylene can be employed, for example, a slurry polymerization process wherein propylene is polymerized in an inert solvent including an aliphatic hydrocarbon such as butane, pentane, hexane, heptane, isooctane, an alicyclic hydrocarbon such as cyclopentane, cyclohexane, methylcyclohexane, an aromatic hydrocarbon such as toluene, xylene, ethylbenzene, and gasoline fraction and hydrogenated diesel oil; a bulk polymerization process wherein propylene itself is used as a solvent; a gas phase polymerization process wherein propylene is polymerized in a gas phase; a solution polymerization process wherein polypropylene producing by polymerization is liquid; and a combination of these two or more polymerization processes.

As the polymerization conditions, similar conditions to those in the olefin polymerization using known conventional Ziegler-Natta catalyst system are employed. More specifically, the polymerization temperature ranges from −50 to 150° C., preferably −10 to 100° C., most preferably 40 to 80° C. The polymerization time is usually about one minute to 20 hrs. The molecular weight of the resulting propylene terpolymer can be controlled by choice of the polymerization conditions as mentioned above, or alternatively, by introducing a molecular weight modifier, e.g., hydrogen into the copolymerization system.

In the production of the present terpolymers, small amounts of α,ωadienes such as 1,5-hexadiene, 1,9-decadiene or the like may be copolymerized, if desired, to a degree not impairing the effect of the present invention.

After the completion of the copolymerization reaction, through known after-treatment steps including the steps of deactivating the catalyst, removing the catalyst residue and drying, the aimed terpolymers can be produced.

The resin compositions of the present invention comprise the present terpolymer as a base resin, with which the desired additive components are compounded.

The additive components include various additives generally incorporated in the polypropylene resin composition, and synthetic resins or the like. These additives include, for example, antioxidants such as phenol-, thioether- or phosphorus-antioxidants; ultraviolet absorbing agents; heat stabilizers; heavy metal inactivators (copper pollution inhibitors); clarifiers; antistatic agents; nucleating agents; lubricants; anti-fogging agents; flame retardants; auxiliaries for flame redardants; antiblocking agents; anti-dropping agents; radical generators; colorants such as pigments, dyes; halogen scavengers; dispersing agents or neutralizing agents such as metal soaps; organic or inorganic antibacterial agents; inoranic fillers, e.g., talc, mica, clay, wollastonite, zeolite, calcium carbonate, magnesium carbonate, aluminum hydroxide, magnesium hydroxide, hydrotalcite, basic aluminum lithium hydroxycarbonate hydrate, silicon dioxide, titanium dioxide, zinc oxide, magnesium oxide, calcium oxide, zinc sulfide, barium sulfate, potassium sulfate, carbon fibers, carbon black, graphite and metallic fibers; organic fillers, e.g., wood flour, pulp, wastepaper, synthetic fibers, natural fibers; coupling agents, e.g., silane-, titanate-, boron-, aluminate- or zircoaluminate-coupling agents; and the inorganic or organic fillers which are surface-treated with any of the coupling agents.

The synthetic resins which are used as the additive component include, for example, polyolefins such as polyethylene, polypropylene, poly(1-butene), poly(1-pentene), poly(1-hexene), poly(1-octene), poly(1-decene), poly(4-methyl-1-pentene), poly(3-metyl-1-pentene); polystyrene; random or block copolymers such as ethylene/propylene, propylene/1-butene; and rubber components such as polybutadiene, polyisoprene, natural rubbers and the hydrogenated products thereof.

In general, the resin compositions can be used for the production of various molded or formed product, in the form of pellets prepared by compounding a base resin comprising the present terpolymer with a prescribed amount of the desired additive component, subjecting the compound to melt-kneading and followed by cutting into granulates. The additive components and the amount compounded are selected appropriately, depending on the purpose of molding or forming and the molding or forming method to be employed.

The melt-kneading temperature is usually 170 to 300° C., preferably 180 to 270° C. For melt-kneading and pelletizing, conventional mixing apparatus, e.g., Henschel mixer (trade name), Super mixer (trade name), ribbon blender, Banbury mixer, etc. and a single screw extruder, a double-screw extruder, Brabender, roll, etc. are used in combination.

The molded or formed products of the present invention include various films and sheets, various injection-molded parts, various containers, pipes, fibers or the like, which are formed or molded from the above-mentioned resin compositions. These forming or molding can employ a variety of methods known as the molding method of polypropylene, e.g., injection molding, extrusion molding, foaming molding, blow molding or the like.

The films formed from the resin compositions include unstretched films, uniaxially stretched films, biaxially oriented films or the like, of usually 1 to 150 $\mu$m, preferably 10 to 90 $\mu$m. They also include a composite film comprising the above-mentioned film layer and other polypropylene film layer.

The films of the present invention are excellent in rigidity and heat resistance, because the terpolymer as a base resin for the resin composition has relatively high weight average molecular weight (Mw), low polydispersity index (Mw/Mn) and high melting point (Tm). They are also excellent in anti-blocking property, because the terpolymer has low content of a component eluted in o-dichlorobenzene at low temperatures (low molecular weight component). Further, they are excellent in transparency, because the terpolymer has excellent uniformity of a comonomer unit.

The unstretched film is prepared, for example, by quenching a melt-extruded film below 90° C. under conventional film-forming conditions of a polypropylene film, employing known T-die and tubular methods, etc. as a method of forming a film. Subsequently, the thus prepared film is stretched to a longitudinal direction or a transverse direction employing known methods such as tentering method, thereby producing a uniaxially stretched film. Further, the film is stretched to both longitudinal and transverse directions to prepare a biaxially oriented film. The stretch ratio is usually 3 to 6 times for the longitudinal direction and 6 to 10 times for the transverse direction. In particular, the film which is stretched by 4 to 5.5 times to the longitudinal direction exhibits high rigidity.

The composite film comprises the above-mentioned film layer and a conventional polypropylene film layer, preferably a crystalline polypropylene film layer. The composite films can be prepared, for example, by a method wherein the above unstretched film is laminated on the crystalline polypropylene film by extruding the above resin composition and a method wherein the above resin composition and other polypropylene composition are co-extruded by T-die and tubular methods, etc.

A composite film having excellent heat-sealing property is prepared by selecting as a polypropylene film layer to be laminated with the film layer formed from the above resin composition, a film layer formed from a polypropylene composition comprising as a base resin a polypropylene having higher melting point than the present polypropylene terpolymer.

The sheets are formed from the present resin composition, employing an injection molding process, an extrusion process or the like. These sheets are excellent in rigidity, heat resistance, transparency and anti-blocking property, similarly to the above films.

Further, various industrial parts, containers, etc. having excellent rigidity, heat resistance and transparency, etc. can be formed from the present resin composition, employing an injection molding process, an extrusion process or the like, similarly to the sheet.

The invention is further illustrated by the following Examples and Comparative Examples.

(A) Propylene/ethylene/α-olefin Terpolymers

EXAMPLE 1

Preparation of Supported Metallocene Catalyst

A 4-dm$^3$ glass reactor purged with nitrogen was charged with 1.37 l (4.11 mol in terms of Al atom) of a toluene solution of methylaluminoxane (3 mol/l concentration, available from Toso-Akzo Co., Ltd. under the trade name of PMAO) and as a metallocene compound, 16.6 mmol of a mixture (content of meso form, 1 mol %) of chiral dimethylsilylene-( 2,3,5-trimethylcyclopentadienyl)(2',4',5'-trimethylcyclo-pentadienyl)zirconium dichloride and its meso form, dimethylsilylene(2,3,5-trimethylcyclopentadienyl)(2',3',5'-trimethylcyclopentadienyl)zirconium dichloride, and the mixture was stirred and reacted at 25° C. for 5 hrs. to obtain a reaction product.

Subsequently, the reactor was charged with 100 g of silica (SYLOPOL 948, manufactured by Grace Davison Co., Ltd.) having an average particle size of 51 $\mu$m which was previously fired under reduced pressure at a temperature of 750° C. for 8 hrs, the temperature within the reactor was elevated to 100° C., the contents of the reactor were kept for one hour with stirring to carry out a contact reaction of the reaction product as prepared above with silica, thus obtaining a slurry of the particles wherein a reaction product of methylaluminoxane and the metallocene compound was supported on the silica.

After the temperature within the reactor was lowered to −10° C., 2 l of n-hexane were charged, the slurry was stirred for 5 minutes and then allowed to stand, and the solvent was separated by decantation. While keeping the temperature within the reactor at −10° C., subsequently, 2 l of n-hexane were charged into the reactor, the slurry was stirred and washed for 5 minutes, and allowed to stand. 25 After an operation for separating a washing solvent by decantation was repeated four times, 2 1 of n-hexane were further charged into the reactor to disperse the washed particles in n-hexane into a slurry. Preactivation of supported metallocene catalyst A 4-dm$^3$ stainless reactor purged with nitrogen and equipped with a stirrer was charged with 2 l of n-hexane, and the particle/n-hexane slurry as prepared above was transferred to the reactor kept at 0° C. While keeping the temperature within the reactor at 0° C. with stirring, propylene gas was fed for 90 minutes at a rate of 0.15 mol/min to carry out a prepolymerization, by which the resulting propylene homopolymer was supported on the supported metallocene catalyst as prepared above. During the prepolymerization, unreacted propylene gas was continuously discharged out of the reactor. After the prepolymerization time elapsed, the feed of propylene gas was stopped, and then a gas phase area within the reactor was purged with nitrogen, while elevating the temperature within the reactor to 25° C.

After the solvent was separated by decantation from the reaction mixture, 2 l of n-hexane were charged, the preactivated, supported metallocene catalyst was stirred and washed for 5 minutes, and a washing operation for separating the solvent by decantation was repeated four times. 2 l of n-hexane were further charged into the reactor to disperse the resultant preactivated, supported metallocene catalyst in n-hexane into a slurry.

A part of the resultant preactivated, supported metallocene catalyst/n-hexane slurry was collected, the solvent was separated therefrom, the slurry was dried under reduced pressure to give the preactivated, supported metallocene catalyst which was analyzed. This result showed that 0.7 g of polypropylene was supported per gram of the supported metallocene catalyst prior to preactivation.

The result of a compositional analysis showed that said catalyst contained 0.36% by weight of Zr and 11.8% by weight of Al.
Production of propylene/ethylene/1-butene terpolymer (PEB1)

A 1.5-1 autoclave purged completely with nitrogen and equipped with a stirrer was charged with 1 l of liquefied propylene, 40 g of 1-butene and 1 mmol of triethylaluminum, and the mixture was stirred at 40° C. for 15 minutes. Then ethylene was fed to the autoclave, the pressure was applied, and stirring was continued for 30 minutes, while keeping the pressure at 1.63 MPa. Further, 29 mg of the preactivated, supported metallocene catalyst as prepared above were added, and the polymerization was carried out for one hour, while keeping the internal temperature of the autoclave at 40° C. After completion of the polymerization, unreacted monomer was discharged, and the contents were taken out of the autoclave to obtain 72 g of a propylene/ethylene/1-butene terpolymer (PEB1). Analysis and determination for the physical properties of propylene/ethylene/1-butene terpolymer The resultant propylene/ethylene/1-butene terpolymer (PEB1) was analyzed and determined for the following physical properties. The results were shown in Table 1.

(a) Content of ethylene unit (mol %), (b) Content of 1-butene unit (mol %), (c) Molar ratio of ethylene units/1-butene units, (d) Content of comonomer unit (mol %), (e) Content of propylene unit (mol %), and (f) Content of 2,1- and 1,3-propylene units (mol %).

The results of the above items are based on $^{13}$C-NMR spectra determined by $^{13}$C-NMR spectroscopy as mentioned above.

(g) Weight average molecular weight (Mw) and (h) Ratio of weight average molecular weight/number average molecular weight (Mw/Mn).

The above items are based on the results determined by GPC as mentioned above.

(i) Amount of component eluted at 40° C. or below (wt %), (j) Elution peak temperature (° C.) and (k) Amount of component eluted within the ±10° C. range of elution peak temperature (wt %).

The above items are based on the results of o-dichlorobenezene elution test as mentioned above.

(l) Melting point (Tm) (° C.) and (m) Temperature of crystallization (Tc) (° C.).

The above items are based on the results determined by differential scanning calorimetry.

Temperature of crystallization (Tc) is determined by raising the temperature to 230° C. at a rate of 20° C./min subsequent to the determination of the melting point (Tm), keeping the temperature at 230° C. for 10 minutes, lowering the temperature to 150° C. at a rate of 80° C./min and to lower than 150° C. at a rate of 5° C./min, and measuring the temperature at which the crystallization exhibits the maximum peak.

(n) Melt flow rate (MFR) (g/10 min)

Determined at a temperature of 230° C. and a load of 21.18N according to the condition 14 in Table 1 of JIS K7210.

EXAMPLE 2

Production of propylene/ethylene/1-butene terpolymer (PEB2)

Propylene, ethylene and 1-butene were copolymerized under the same condition as in Example 1, but using 34 mg of the supported metallocene catalyst, 73.5 g of 1-butene and keeping at 1.51 MPa the pressure within the autoclave pressurized with ethylene, thus producing 83 g of the propylene terpolymer (PEB2).

The resultant propylene terpolymer (PEB2) was analyzed and determined for the physical properties in a similar manner as in Example 1. The results were shown in Table 1.

EXAMPLE 3

Production of propylene/ethylene/1-butene terpolymer (PEB3)

Propylene, ethylene and 1-butene were copolymerized under the same condition as in Example 1, but using 20 g of 1-butene, thus producing 43 g of the propylene terpolymer (PEB3).

The resultant propylene terpolymer (PEB3) was analyzed and determined for the physical properties in a similar manner as in Example 1. The results were shown in Table 1.

EXAMPLE 4

Preparation of Supported Catalyst

A 4-dm$^3$ glass reactor purged with nitrogen was charged with 1.37 l (4.11 mol in terms of Al atom) of a toluene solution of methylaluminoxane (3 mol/l concentration, available from Toso-Akzo Co., Ltd. under the trade name of PMAO) and as a metallocene compound, 16.8 mmol of a mixture (content of meso form, 1 mol %) of chiral dimethylgermylene-(2,3,5-trimethylcyclopentadienyl)(2', 4',5'-trimethylcyclo-pentadienyl)zirconium dichloride and its meso form, dimethylgermylene(2,3,5-trimethylcyclopentadienyl)(2', 3',5'- trimethylcyclopentadienyl)zirconium dichloride, and the mixture was stirred and reacted at 25° C. for 5 hrs. to obtain a reaction product of the metallocene compound and the aluminoxane.

Subsequently, the reactor was charged with 100 g of silica (SYLOPOL 948, manufactured by Grace Davison Co., Ltd.) having an average particle size of 51 μm which was previously fired under reduced pressure at a temperature of 750° C. for 8 hrs, the temperature within the reactor was elevated to 100° C., the contents of the reactor were kept for one hour with stirring to carry out a catalytic reaction of the reaction product as prepared above with silica, thus obtaining the particles wherein a reaction product of the metallocene compound and the aluminoxane was supported on the silica.

After the temperature within the reactor was lowered to −10° C., 2 l of n-hexane were charged, the slurry was stirred for 5 minutes and then allowed to stand, and the solvent was separated by decantation. While keeping the temperature within the reactor at −10° C., subsequently, 2 l of n-hexane were charged into the reactor, the slurry was stirred and washed for 5 minutes, and allowed to stand. After a washing operation for separating a washing solvent by decantation was repeated four times to obtain the supported metallocene catalyst. 2 l of n-hexane were further charged into the reactor to disperse the supported metallocene catalyst into a slurry. Preactivation of supported metallocene catalyst A 4-dm3 stainless reactor purged with nitrogen and equipped with a stirrer was charged with 2 l of n-hexane, and the supported metallocene catalyst/n-hexane slurry as prepared above was transferred to the reactor kept at 0° C. While keeping the temperature within the reactor at 0° C. with stirring, propylene gas was fed for 90 minutes at a rate of 0.15 mol/min to carry out a prepolymerization, by which the resulting propylene homopolymer was supported on the supported metallocene catalyst as prepared above. During the prepolymerization, unreacted propylene gas was discharged out of the reactor. After the prepolymerization time elapsed, the feed of propylene gas was stopped, and then a gas phase area within the reactor was purged with nitrogen, while elevating the temperature within the reactor to 25° C.

After the solvent was separated by decantation from the reaction mixture, 2 l of n-hexane were charged, the preactivated, supported metallocene catalyst was stirred and washed for 5 minutes, and a washing operation for separating the solvent by decantation was repeated four times. Subsequently, 2 l of n-hexane were charged into the reactor to disperse the resultant preactivated, supported metallocene catalyst in n-hexane into a slurry.

A part of the resultant slurry was collected, the solvent was separated therefrom, the slurry was dried under reduced pressure to give the preactivated, supported metallocene catalyst which was analyzed. This result showed that 0.6 g of polypropylene was supported per gram of the supported metallocene catalyst prior to preactivation.

The result of a compositional analysis showed that the catalyst contained 0.35% by weight of Zr and 11.0% by weight of Al.
Production of propylene/ethylene/1-butene terpolymer (PEB4)

A 1.5–l autoclave purged completely with nitrogen and equipped with a stirrer was charged with 1 l of liquefied propylene, 40 g of 1-butene and 1 mmol of triethylaluminum, and the mixture was stirred at 40° C. for 15 minutes. Subsequently, the autoclave was pressurized with ethylene, the pressure within the autoclave was kept at 1.63 MPa, and stirring was continued for 30 minutes.

Further, 31 mg of the preactivated, supported metallocene catalyst as prepared above were added, and the copolymerization was continued for one hour, while keeping the internal temperature of the autoclave at 40° C. After completion of the copolymerization, unreacted monomer was discharged, and the contents were taken out of the autoclave to obtain 85 g of a propylene/ethylene/1-butene terpolymer (PEB4).

The resultant propylene terpolymer (PEB4) was analyzed and determined for the physical properties in a similar manner as in Example 1, and the results were shown in Table 1.

EXAMPLE 5

Production of propylene/ethylene/1-butene terpolymer (PEB5)

Continuous polymerization was performed in such a manner that a 200-l reactor for continuous polymerization was charged continuously with liquefied propylene at a rate of 18.2 l/hr, ethylene at a rate of 10 nl/hr, 1-butene at a rate of 2.4 nl/hr, n-hexane at a rate of 7.6 l/hr, the supported metallocene catalyst prepared in Example 1 at a rate of 0.34 g/hr and triethylaluminum at a rate of 7 mmol/hr, so as to provide 140 l of the liquid volume containing the polymer and the contents were taken out so as to maintain the temperature within the reactor at 45° C. and the pressure at 1.16 MpaG. The amount of the polymer powder taken out during the polymerization was 0.5 kg/hr.

Polymer powders were recovered by centrifugation from a slurry containing the polymer powders and dried in a hot nitogen stream for 3 hrs. to obtain the propylene/ethylene/1-butene terpolymer (PEB5).

The resultant propylene terpolymer (PEB5) was analyzed and determined for the physical properties in a similar manner as in Example 1, and the results were shown in Table 1.

Comparative Example 1

Production of propylene/ethylene/1-butene terpolymer (cPEB1)

Propylene/ethylend/1-butene terpolymer (cPEB1) was produced by a continuous polymerization process as in Example 5, using Ziegler-Natta catalyst prepared in accordance with the process disclosed in Japanese Patent Kokai 56–143207.

The resultant propylene terpolymer (cPEB1) was analyzed and determined for the physical properties in a similar manner as in Example 1, and the results were shown in Table 1.

TABLE 1

|  | Example | | | | | Comparative Example |
|---|---|---|---|---|---|---|
|  | 1 | 2 | 3 | 4 | 5 | 1 |
| Propylene terpolymer | PEB1 | PEB2 | PEB3 | PEB4 | PEB5 | cPEB1 |
| Polymerization process | bulk | bulk | bulk | bulk | slurry | slurry |
| Catalyst | supported | supported | supported | supported | supported | Z—N |
| Transition metal compound | STMZ | STMZ | STMZ | GTMZ | STMZ | — |
| Aluminoxane | MA10 | MA10 | MA10 | MA10 | MA10 | — |
| Amount used (mg) | 29 | 34 | 29 | 31 | — | — |
| Organoaluminum compound | TEA | TEA | TEA | TEA | TEA | — |
| Al/Zr molar ratio | 877 | 746 | 877 | 840 | 522 | — |
| Liquefied propylene (1) | 1 | 1 | 1 | 1 | — | — |
| 1-Butene (g) | 40 | 73.5 | 20 | 40 | — | — |
| Reaction pressure (Mpa) | 1.63 | 1.51 | 1.63 | 1.63 | 1.16 | — |
| Reaction temperature (° C.) | 40 | 40 | 40 | 40 | 45 | — |
| Reaction time (min) | 60 | 60 | 60 | 60 | — | — |
| Amount of copolymer produced (g) | 72 | 83 | 43 | 85 | — | — |
| Structure analysis | | | | | | |
| Ethylene unit (mol %) | 1.90 | 3.49 | 0.10 | 2.10 | 0.54 | 4.70 |
| 1-Butene unit (mol %) | 3.80 | 7.76 | 2.30 | 3.70 | 6.28 | 1.70 |
| Ethylene/butene (molar ratio) | 0.50 | 0.450 | 0.043 | 0.568 | 0.086 | 2.76 |
| Comonomer unit (mol %) | 5.70 | 11.25 | 2.40 | 5.80 | 6.82 | 6.40 |
| Miss-inserted propylene unit (mol %) | 0.34 | 0.15 | 0.35 | 0.32 | 0.32 | Not detected |
| Propylene unit (mol %) | 94.30 | 88.75 | 97.60 | 94.20 | 93.18 | 93.6 |
| Weight average molecular weight (MW × $10^{-5}$) | 1.61 | 1.60 | 1.68 | 1.72 | 2.14 | 2.22 |
| Polydispersity index (Mw/Mn) | 2.18 | 1.87 | 2.10 | 2.03 | 2.04 | 4.01 |
| Elution characteristics in o-dichlorobenzene | | | | | | |
| Elution peak temperature (Ep: ° C.) | 84 | 66 | 95 | 85 | 78 | 82 |
| Amount eluted within the ±10° C. range of Ep (wt %) | 96.6 | 82.8 | 97.7 | 95.8 | 97.1 | 70.2 |
| Amount eluted below 40° C. (wt %) | 1.29 | 6.06 | 0.92 | 1.20 | 0.4 | 6.1 |
| Melting point (Tm: ° C.) | 131.7 | 114.7 | 145.4 | 130.2 | 132.4 | 130.0 |
| Melt flow rate (MFR: g/10 min) | 15.1 | 13.1 | 15.1 | 10.7 | 5.1 | 6.0 |

The abbreviation in the table refers to the following:
Z-N: Ziegler-Natta,
STMZ: Dimethylsilylene(2,3,5-trimethylcyclopentadienyl)-(2',4',5'-trimethylcyclopentadienyl)zirconium dichloride,
GTMZ: Dimethylgermylene(2,3,5-trimethylcyclopentadienyl)-(2',4',5'-trimethylcyclopentadienyl)zirconium dichloride,
MA10: Methylaluminoxane,
TEA: Triethylaluminum.

Table 1 shows that the propylene terpolymers of the present invention (PEB1–5) have high molecular weights and high melting points (Tm), and lower polydispersity index (Mw/Mn) as compared with the terpolymer of Comparative Example 1. Further, it shows that the amount of the component eluted in o-dichlorobenzene at a temperature of not higher than 40° C. is extremely low and the amount of the component eluted in o-dichlorobenzene within the ±10° C. range of an elution peak temperature is high as compared with the terpolymer (cPEB1) of Comparative Example 1.

EXAMPLE 6
and

Comparative Example 2

Preparation of Resin Composition 100 parts by weight, each of the propylene terpolymer (PEB5) produced in Example 5 and the propylene terpolymer (cPEB1) produced in Comparative Example 1 were mixed with 0.05 part by weight of tetrakis[methylene(3,5-di-tert.butyl-4-hydroxyl.hydrocinnamate)]methane, 0.1 part by weight of tris(2,4-di-tert.butyl-phenyl)phosphite and 0.05 part by weight of calcium stearate. The mixture was pelletized using a single screw extruder having a screw diameter of 40 mm and set at an extrusion temperature of 230° C. to prepare a resin composition containing the respective propylene terpolymers as a base resin.

Preparation of Biaxially Oriented, Multi-layer Film

The pellets of the resin composition as prepared above were fed to an extruder equipped with two layer T-die and set at an extrusion temperature of 250° C. A crystalline polypropylene resin composition having a melting point of 160° C. (Chisso Polypro HF 1170 manufactured by Chisso Corporation) used as a base layer was melt in another extruder and fed to the above extruder equipped with two layer T-die. These were co-extruded and lowered to 30° C. to prepare a two layered sheet.

Subsequently, this sheet was stretched 5 times in a machine direction at a preheating temperature of 115° C. and a stretching temperature of 123° C. utilizing the difference in circumferential speed of roll. This stretched sheet was introduced into a heated tenter and further stretched 9 times in a transverse direction at a preheating temperature of 190° C. and a stretching temperature of 160° C., and subsequently subjected to 8% stress relaxation at an annealing temperature of 170° C. to prepare a biaxially oriented, multi-layer film of two layers.

The resultant biaxially oriented, multi-layer film of two layers comprised of the layer of the propylene terpolymer resin composition with the thickness of 1 μm and the base layer of the crystalline polypropylene resin composition with the thickness of 24 μm.

The resultant biaxially oriented, multi-layer film was determined for the following physical properties and the results were shown in Table 2.

(fa) Haze: Internal haze value determined according to ASTM D-1003 (unit: %)

(fb) Gloss: Surface gloss determined according to ASTM D-523 (unit: %)

(fc) Degree of blocking: Two test pieces each 2 cm in length and 2 cm in width were cut off from each film, the test pieces were superposed at the ends of 2 cm with the surfaces of the heat-seal layer being in contact with each other, and a square weight of 1 kg with 2 cm$^2$ in base was put on the superposed area of the test pieces. After the weighted test pieces were left in a thermostat at 40° C. for 24 hrs, the superposed area was determined for a shearing peel strength using a tensile tester (unit: N/4 cm$^2$).

(fd) Heat-seal strength: The films were heat-sealed in 10 mm width at a heat-seal temperature set within the ±10° C. range of the melting point (Tm) of the propylene terpolymer as a base resin under the conditions of a seal pressure at 0.1 MPa and a seal time of 1 sec. The heat-sealed films were cut out in a strip of 15 mm in width to prepare a test piece. The test piece was determined for 90° peel strength at the seal area using a tensile tester (unit: N/15 mm).

(fe) Hot tack strength: Each spring sheet having a width of 75 mm and a restoring force of 111, 172, 273 and 317 gf/inch, respectively was bent by hand in a U-shape with both ends in a width direction being in contact with each other. The U-shaped sheet was covered with a film of 270 mm in length and 75 mm in width with a sealant surface inside, and the film ends 10 mm projected from the spring were superposed. The superposed area was sealed at a pressure of 0.1 Mpa for 0.8 second using a seal bar adjusted at a prescribed temperature. Subsequently, a force for which the spring had been bent was released, and the restoring force of the spring was loaded on the seal area. In case where the seal area had been maintained in a width of 7 mm or more against the restoring force, a hot tack property was judged as "pass". The restoring force of the spring sheet having the highest restoring force of those judged as "pass" was indicated as the hot tack strength of the film at the seal temperature. The operation as mentioned above was performed by varying the temperature of a seal bar (unit: gf/inch).

TABLE 2

|  | Example 6 | Comparative Example 2 |
| --- | --- | --- |
| Propylene terpolymer | PEB5 | cPEB1 |
| Haze (%) | 0.3 | 0.4 |
| Gloss (%) | 153 | 151 |
| Degree of blocking (N/4 cm$^2$) | 6.3 | 8.5 |
| Heat-seal strength (N/15 mm) | 4.1 | 4.0 |

Table 2 shows that the multi-layer film having the heat-seal layer formed from the resin composition comprising the present propylene terpolymer as a base resin is lower in haze and degree of blocking, has higher transparency and is excellent in anti-blocking property, as compared with that of Comparative Example 2. Further, FIG. 1 shows that the multi-layer film having the heat-seal layer formed from the resin composition comprising the present propylene terpolymer as a base resin can achieve a stronger hot tack strength over a broader range of heat-seal temperature, as compared with that of Comparative Example 2.

In spite of the fact that the propylene terpolymers of the present invention are those produced using the metallocene catalyst, they have higher weight average molecular weight (Mw) and lower polydispersity index (Mw/Mn) even in a relatively high comonomer unit content, and have a relatively high melting point (Tm), as shown in Table 1. For the characteristics eluted in o-dichlorobenzene, the amount of the component eluted at low temperatures serving as a tacky component is low, and the amount of the component eluted in the vicinity of an elution peak temperature indicating uniform dispersibility of a comonomer component is high.

Accordingly, the molded articles formed from the resin compositions comprising the present polypropylene terpolymer as a base resin are excellent in rigidity and heat resistance, and further are excellent in transparency, heat-sealing and anti-blocking properties as shown in Table 2, and furthermore have strong hot-tack strength over a broader range of heat-seal temperature.

What is claimed is:

1. A propylene/ethylene/α-olefin terpolymer prepared in the presence of a catalyst containing a Ti or Zr compound, wherein
    i) there is from 0.01 mol % to less than 15 mol % of a comonomer unit with a molar ration of ethylene units/ $C_4$–$C_{20}$ α-olefin units being in the range of from $6.5 \times 10^{-4}$ to 0.99, and from more than 85 mol % to not more than 99.99 mol % of a propylene unit with 2,1- and 1,3-propylene unit being in the range of from 0 to 1 mol %, in a polymer chain determined by $^{13}$C-NMR spectroscopy;
    ii) a weight average molecular weight (Mw) determined by GPC is in the range of from 40,000 to 1,000,000; and
    iii) the amount of the component eluted in o-dichlorobenzene at a temperature of not higher than 40° C. is not more than 10% by weight based on the total weight of the terpolymer and the amount of the component eluted in o-dichlorobenzene within the ±10° C. range of an elution peak temperature is not less than 75% by weight based on the weight of the component eluted at a temperature of higher than 0° C.

2. The terpolymer of claim 1 wherein the amount of the component eluted in o-dichlorobenzene at a temperature of not higher than 40° C. is not more than 6% by weight based on the total weight of the terpolymer.

3. The terpolymer of claim 1 wherein the amount of the component eluted in o-dichlorobenzene within the ±10° C. range of an elution peak temperature is not less than 80% by weight based on the weight of the component eluted at a temperature of higher than 0° C.

4. The terpolymer of claim 1 wherein α-olefin is 1-butene.

5. The terpolymer of claim 1 wherein a ratio (Mw/Mn) of the weight average molecular weight (Mw) to a number average molecular weight (Mn) ranges from 1.5 to 2.5.

6. The terpolymer of claim 1 wherein a melting point (Tm) ranges from 100° C. to 160° C.

7. A resin composition comprising the propylene/ ethylene/α-olefin terpolymer of claim 1 as a base resin.

8. A molded product formed from the resin composition of claim 7.

9. The product of claim 8 which is film or sheet.

10. A propylene multi-layer film having a heat-seal layer formed from the resin composition of claim 7.

11. A propylene/ethylene/α-olefin terpolymer according to claim 1, wherein the catalyst is a catalyst containing a Zr compound.

12. A propylene/ethylene/α-olefin terpolymer according to claim 1, wherein the catalyst is a catalyst containing a metallocene compound represented by formula (1)

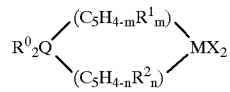
(1)

wherein M represents titanium or zirconium, each X independently represents a hydrogen atom, a halogen atom or a hydrocarbyl radical, $(C_5H_{4-m}R^1{}_m)$ and $(C_5H_{4-n}R^2{}_n)$ represent a substituted cyclopentadienyl group in which m and n are an integer of 1 to 3, $R^1$ and $R^2$ each independently represent a hydrocarbyl radical of 1 to 20 carbons, a silicon-containing hydrocarbyl radical or a divalent group in which both two $R^1$s and two $R^2$s respectively can join or either of two $R^1$s and two $R^2$s can join with adjacent two carbon atoms on the cyclopentadienyl ring to form one or more hydrocarbon rings of 4 to 8 carbons which may be substituted by said hydrocarbyl radical, with the substitution position of $R^1$ and $R^2$ on the two cyclopentadienyl rings being arranged so as not to have a symmetry plane containing M, and Q represents a silicon atom or a germanium atom, and each $R^0$ independently represents a hydrogen atom, a halogen atom or a hydrocarbyl radical.

* * * * *